(12) United States Patent
Addesso et al.

(10) Patent No.: US 6,926,341 B1
(45) Date of Patent: Aug. 9, 2005

(54) CAR DOOR UPHOLSTERY PET PROTECTOR

(76) Inventors: Steven Anthony Addesso, 3437 N. Overhill, Chicago, IL (US) 60634; Maryann Addesso, 3437 N. Overhill, Chicago, IL (US) 60634

( * ) Notice: Subject to any disclaimer, the term of this patent is extended or adjusted under 35 U.S.C. 154(b) by 0 days.

(21) Appl. No.: 10/938,334

(22) Filed: Sep. 10, 2004

(51) Int. Cl.$^7$ .................................................. B60J 9/00
(52) U.S. Cl. ....................... 296/153; 119/712; 119/106; 160/105
(58) Field of Search ............................ 296/153; 49/57, 49/50; 119/28.5, 702, 706, 712

(56) References Cited

U.S. PATENT DOCUMENTS

| | | | |
|---|---|---|---|
| 2,274,026 A | * | 2/1942 | Allen .......................... 296/153 |
| 2,803,493 A | * | 8/1957 | Haefliger ..................... 296/153 |
| 2,877,049 A | | 3/1959 | Lucas |
| 4,639,027 A | | 1/1987 | Boyd |
| 4,758,043 A | | 7/1988 | Reynaldos |
| 4,781,231 A | | 11/1988 | Garcia et al. |
| 4,805,957 A | * | 2/1989 | Fletcher ....................... 296/153 |
| 4,825,957 A | | 5/1989 | White et al. |
| 4,950,023 A | | 8/1990 | Waller et al. |
| 5,004,292 A | | 4/1991 | Horne |
| D329,836 S | | 9/1992 | Meyers |
| 6,000,365 A | | 12/1999 | Charnesky |

* cited by examiner

*Primary Examiner*—Lori L. Coletta
(74) *Attorney, Agent, or Firm*—Adam Sacharoff; Much Shelist

(57) ABSTRACT

A portable pet car door protector for protecting a car door. The car door typically includes an interior panel, a window, and a well defined between the window, and the interior panel. The protector includes a flap which is insertable in the well between the window and the interior portion of the car door. A pad is secured to the top edge of the flap and the pad has a length sufficient to extend over the interior portion of the car door and extend approximately to the floor board, such that the pad covers substantially the entire interior portion of the car door to protect the same from an animal's nails and teeth. The protector has includes at least one hang tab secured to the top edge of the flap, such that a user may easily install and remove the protector from the well.

14 Claims, 5 Drawing Sheets

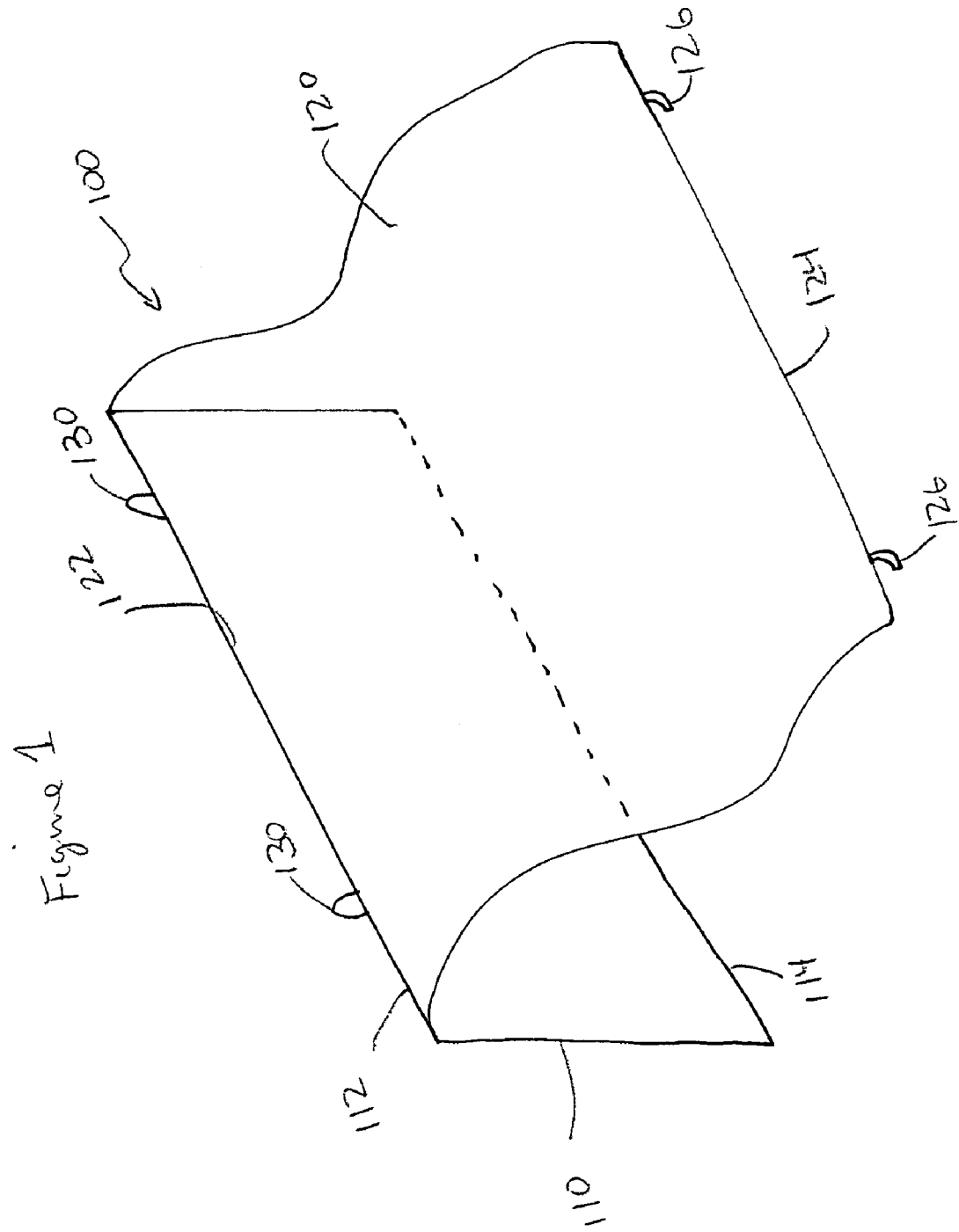

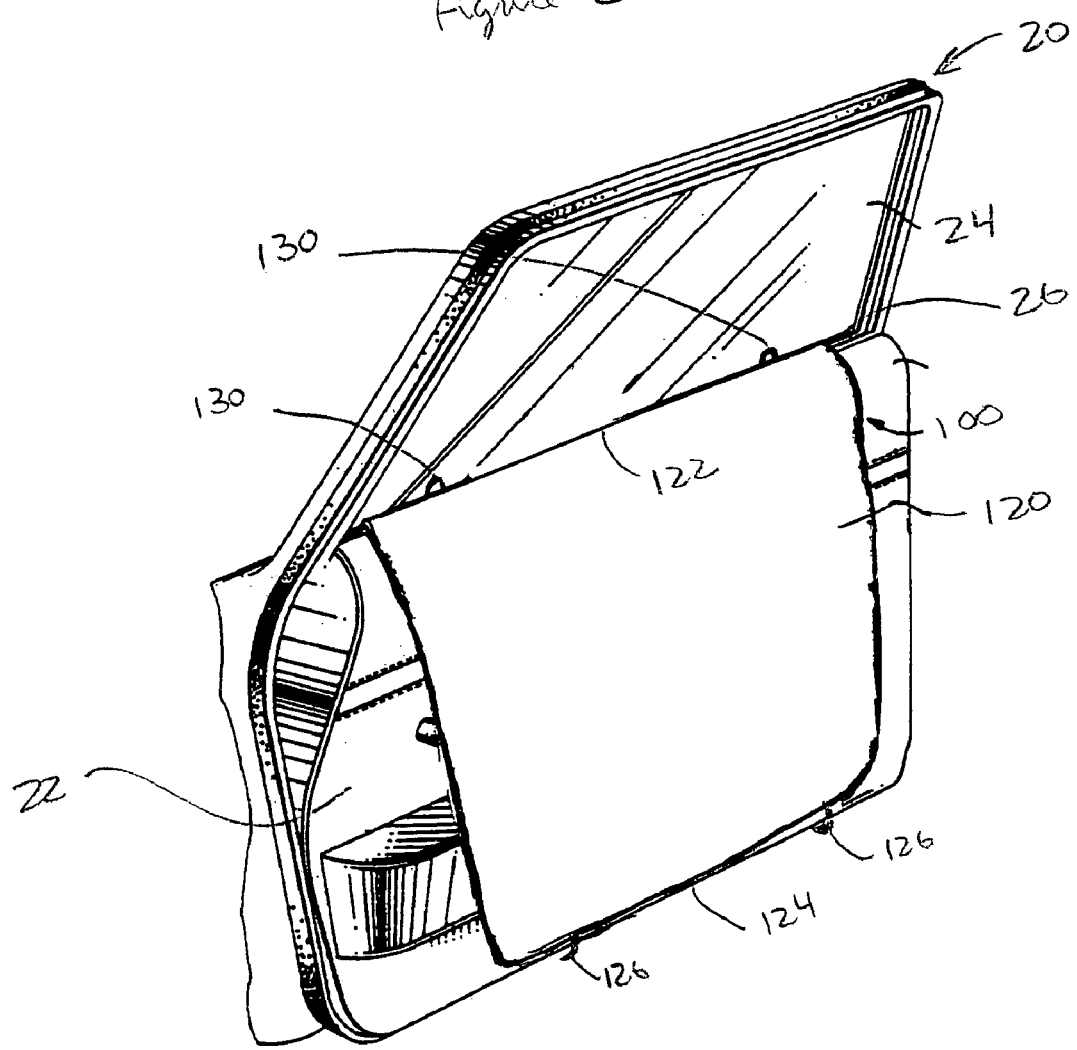

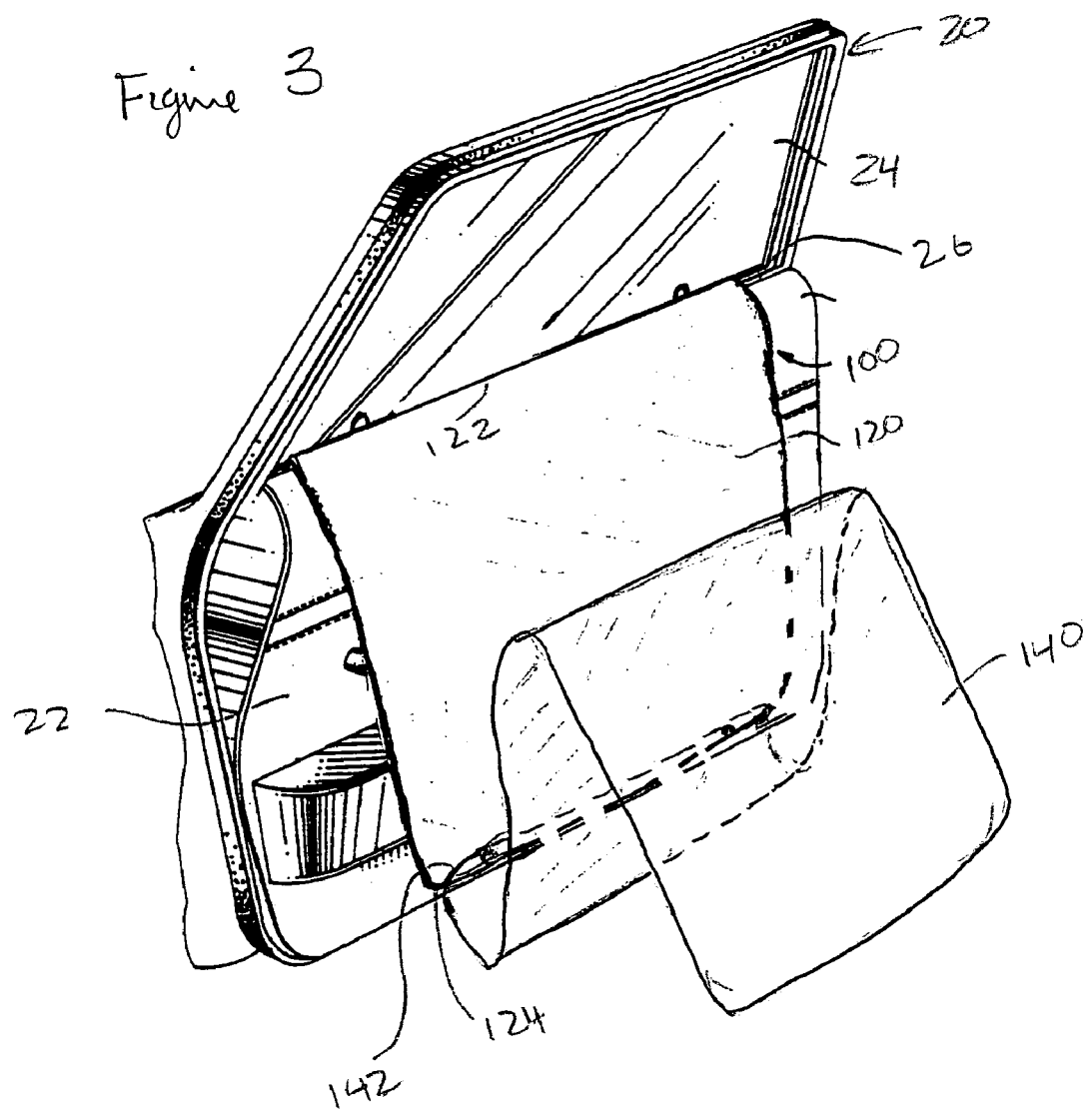

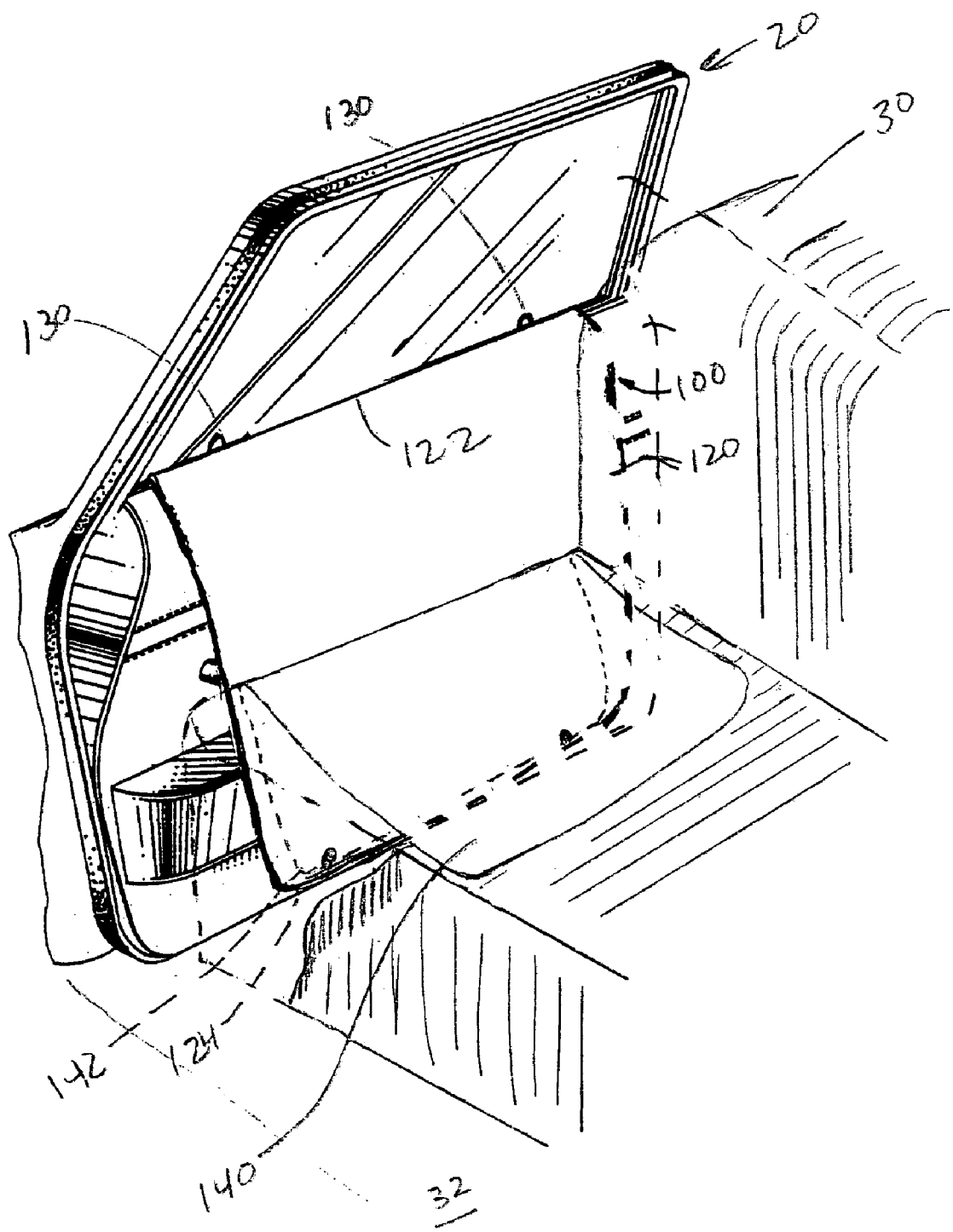

CAR DOOR UPHOLSTERY PET PROTECTOR

FIELD OF THE INVENTION

The present invention relates to a car door upholstery pet protector.

BACKGROUND OF THE INVENTION

The use of protective covering for vehicle door panels are well known in the art. While most are directed to protecting the windowsill or door panel from human oils and sunlight, less are specifically designed to deal with protecting the door panel from pets and scratches caused by pet nails. When a pet is in the backseat the pet often tries to look out the window by placing its paws on the windowsill or arm rest. If the pet's nails are not filed down, the pet will more than likely scratch the door and the upholstery. As one can imagine, it is extremely costly to replace the upholstery, which ultimately leads to reducing the resale value of the owners cars.

Various prior art patent include, U.S. Pat. No. 5,004,292 to Horne discloses a flap that rests against the window glass and the door panel. A second flap is secured to the top of the first flap by the means of a clip. The second flap is positioned over the interior of the door. In order to remove the '292 apparatus, the window is moved to the down position. This requires, first that the vehicle is either running, or that the window be in a down position while the animal is possibly in the back seat unattended. This may cause extreme problems, especially if the animal is prone to jumping out of the vehicle.

U.S. Pat. No. 2,274,026 to Allen that discloses an arm protector for automobile doors. The protector includes a first element, referred to as an L-shaped shield, with a relatively short arm that extends downwardly between the automobile window and the inside door panel, a second element that is a flap member which is designed to extend onto the outer portion of the door frame, and a third element that is a hinge which connects the shield and the flap. The shield is designed to be permanently affixed to the door. The flap folds on the inside of the shield when the window is rolled up, and when the window is rolled down, the flap extends outwardly onto the outer part of the door frame.

U.S. Pat. No. 2,462,768 to Ortleb discloses a protector pad which includes two separate portions. The two portions are connected together or are secured together by being looped about a stiffening element. The stiffening element, with the two portions secured thereto, is adapted to be disposed against the window on the inside of the door frame. With the window rolled down, one portion extends outwardly over the rolled down window and the other portion of the door frame, and the other portion extends inwardly over the interior portion of the door frame. The apparatus also includes clips extending about the stiffening member and upwardly, over the interior of the door frame.

U.S. Pat. No. 2,617,679 to Maguire discloses body belt molding apparatus for a vehicle body. The apparatus is designed to be permanently secured as molding on a vehicle body, particularly adjacent to movable glass members, such as on doors and adjacent to doors in vehicles with convertible tops.

U.S. Pat. No. 2,709,620 to Tinsley et al. discloses an automobile arm rest apparatus that includes a concavely configured plate with padding on the outer portion of the plate. Secured to the central portion of the convex element is a downwardly extending spring element having a V-shaped configuration. One arm of the '620 patent is secured to the plate, while the V-shaped portion extends downwardly therefrom and is disposed between the vehicle frame and the window.

U.S. Pat. No. 2,711,344 to Larson discloses another type of arm rest protector for an automotive vehicle. The arm rest protector includes a generally flat plate portion secured to a wire frame. The wire frame includes bent portions designed to lock between the window glass and the adjacent portion of the frame of the vehicle. It appears that once locked in place, it may not be easily removed. The flap moves and pivots on the frame from an upper, use position, where the flap is disposed on the top of the door frame, with the window rolled down, to the storage position on the inside of the door, as when the window is rolled up.

U.S. Pat. No. 4,758,043 to Reynaldos discloses a flap for an automotive vehicle window which includes a pair of legs at opposite ends of the flap which extend on the inside of the vehicle and are appropriately secured to the inside of the vehicle door. The flap then extends upwardly from the arms and outwardly over the door frame. The outer portion of the flap, remote from the arms, includes magnetic elements to secure the flap to the exterior of the door while in use.

U.S. Pat. No. 4,805,957 to Fletcher discloses a combination window sill arm rest and sun screen. The apparatus includes essentially two different portions, an outer portion which magnetically attaches to the outside of the door, and an inner portion which drapes over the door and over the window and is loosely disposed on the inside of the door frame. When the window is rolled up, the magnetically attached portion remains in place, and the inside portion simply moves upwardly on the window to comprise a window screen portion.

It is noted that all of the above apparatus include various types of limitations of inconveniences. Some are easily removed, but others are not. Some require relatively permanent attachments to some part of the vehicle, and others include relatively rigid frames disposed either on the interior of the vehicle or downwardly inside the door between the glass and the door frame.

The apparatus of the present invention overcomes the deficiencies of the prior art by providing an element which is relatively easily installed and relatively easily removed, as desired. The apparatus may conveniently be used whether the window is up or down. The apparatus includes a convenient covering over the interior portion of the door frame to protect the interior of the door frame from pet nails. In addition, the apparatus includes a more convenient means of removing the inserting the apparatus.

SUMMARY OF THE INVENTION

In accordance with the present invention a portable pet car door protector for protecting a car door. The car door typically includes an interior panel, a window, and a well defined between the window, and the interior panel. The protector includes a flap which is insertable in the well between the window and the interior panel of the car door. A pad is secured to the top edge of the flap and the pad has a length sufficient to extend over the arm rest on the interior panel of the car door, such that the pad covers a substantial portion of the interior panel of the car door to protect the same from an animal's nails and teeth. The protector has includes at least one hang tab secured to the top edge of the flap, such that a user may easily install and remove the protector from the well.

In another embodiment the protector could include a third section that is removable from the pad section. The third section would cover a portion of the vehicle bench or chair such that an animal could rest on the third section without getting animal hair on the bench or accidentally relieving themselves on the bench or chair.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 1 is a perspective view of a door protector in accordance with one embodiment of the present invention;

FIG. 2a is a perspective view of a car door with the door protector from FIG. 1;

FIG. 3 is a perspective view of a car door with a door protector in accordance with a second embodiment of the present invention with a seat cover; and FIG. 4 is a perspective view of the inside of a vehicle with the door protector from FIG. 4.

DETAILED DESCRIPTION OF THE EMBODIMENTS

Figure 2B:
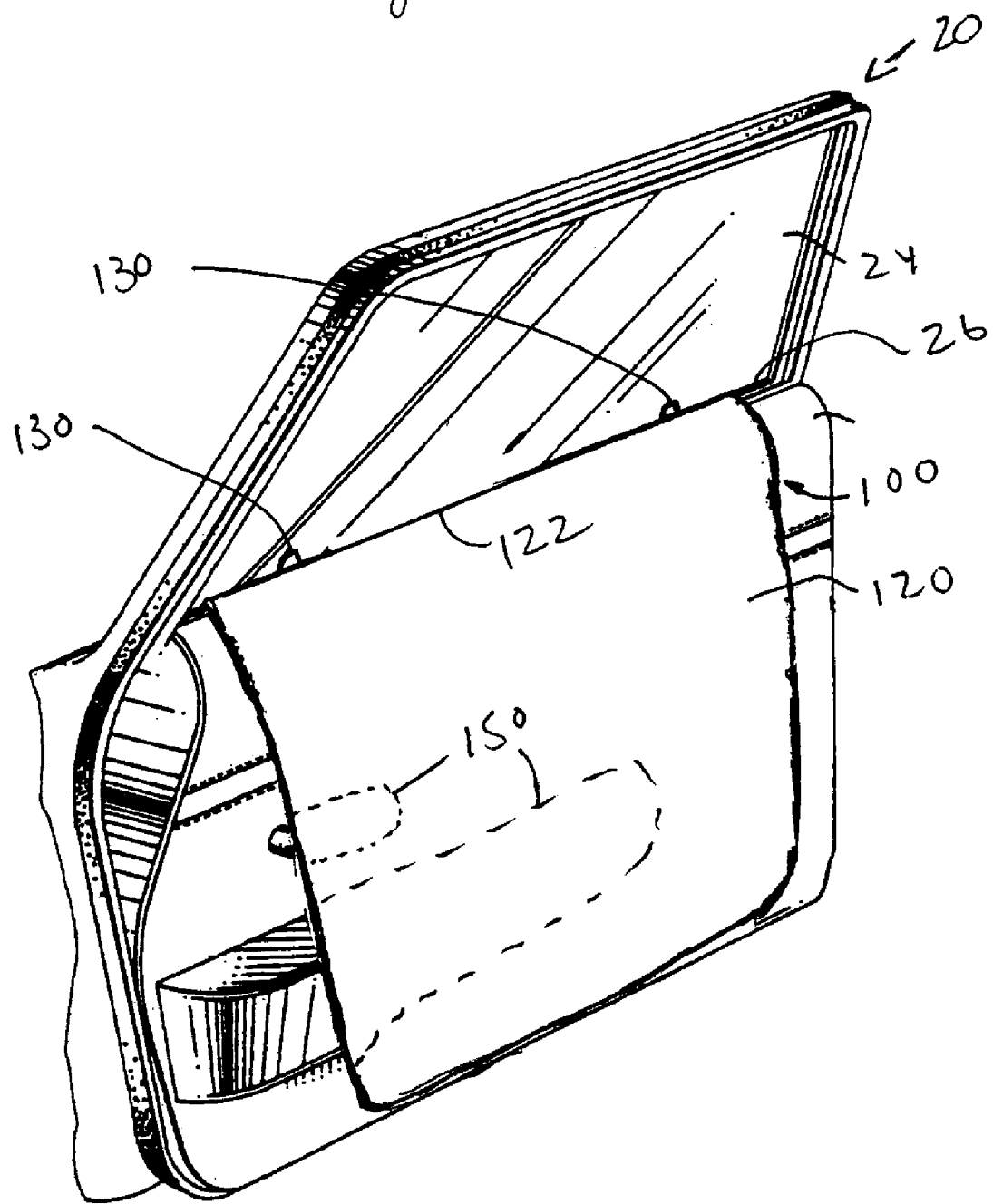
FIG. 2b is a perspective view of a car door with the door protector from FIG. 1 that includes perforated sections.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Referring to FIGS. 1 and 2a, in accordance to the present invention, a portable pet car door protector 100 is illustrated and shown. The protector 100 is designed to protect a car door 20 that includes an interior panel 22, a window 24, and a well 26 defined between the window 24 and the interior panel 22. The window 24 may be movable with respect to the interior panel 22, however it is not necessary for the invention. The interior panel 22 extends down to a floor board 32 (FIG. 4) defined by the vehicle.

The protector 100 includes at least two sections. The first section is a flap 110 which is insertable in the well 26 between the window 24 and the interior panel 22 of the car door 20. The flap includes a top edge 112 and a bottom edge 114. In one instance the flap 110 has a predetermined length such that when the flap 110 is inserted into the well 26 the bottom edge 114 extends below the top edge defined by the window 24, when the window 24 is in its lowest position. This prevents the flap 110 from moving to the outside of the window, which as one can imagine would cause the protector 100 to move upwardly if the window was moved up. The size and material of the flap is immaterial to the scope of the invention. However, it is contemplated by the invention to utilize a durable material that would permit the flap from being properly inserted into the well 26 without the flap 110 becoming tangled or slacked.

Secured to the flap 110 is a second section or pad 120. The pad 120 includes a top edge 122 that is secured to the top edge 112 of the flap 110. The means of securing the two sections is not important to the scope of the invention. The pad 120 has a predetermined length sufficient to extend over the arm rest defined on the interior panel 22 of the car door 20. In some instances that pad may extend approximately to the floor board. In either instance the pad 120 covers a substantial portion of the interior panel of the car door 20 and thus protects the same from the pet's nails and teeth. In addition, since the pad 120 covers the door handle, any window and door locking mechanisms would be covered. It would thus be advisable for the side of the car that the protector 100 is placed to be absent of any person or child, as the person or child would not be able to quickly exist the car through the same side as the protector.

The pad 120 may also include a means to secure the bottom edge 124 to the the car door 20 such that the pet or animal could not lift or move the pad 120. The securing means may be but is not limited to hooks 126 or anchors that hook to the lower portion of the car door 20 such that when the car door 20 is closed, the hooks 126 are sandwiched between the car door 20 and the vehicle.

Secured to the protector 100 is at least one, preferably two, hang tags 130. The hang tags 130 are placed near the top edge 112 of the flap 110 or the top edge 122 of the pad 120. The hang tags are used to properly insert and remove the protector 100, namely the flap 100, from the well 26. This is a huge advantage over the prior art, which had to rely on the window being in the down position to insert and remove the prior door coverings. Since, it is more often that the owner does not want to roll down the window while an animal is in the back set of the vehicle, because the animal may jump out of the window and escape. As such, it was extremely difficult to properly insert and remove the prior art door coverings. The size and placement of the hang tags 130 are not material to the scope of the invention.

In another aspect of the invention, the protector 100 includes a third section. The third section or seat cover 140, protects a portion of the vehicle bench 30. The seat cover 140 includes a top edge 142 that is secured to the bottom edge 124 of the pad 120. A means of securing the seat cover 140 to the pad 130 is preferably such that the seat cover 140 is removable from the protector 100. This would allow the seat cover 140 to be washed or replaced. The seat cover 140 protects the bench 30 from animal hair and from accidents.

In addition, as illustrated in FIG. 2c, the pad 120 may include perforated sections 150 that the user may easily remove the perforated sections, to expose the door handle or arm rest.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A portable pet car door protector for protecting a car door that includes an interior panel, a window, and a well defined between the window and the interior panel, wherein the window may be movable with respect to said interior panel, the interior panel includes an arm rest, the apparatus comprising:

a flap which is insertable in said well between said window and said interior panel of the car door, the flap having a top edge;

a pad secured to the top edge and having a length sufficient to extend over said interior panel of said car door and extend approximately over said arm rest, such that the pad covers a substantial portion of the interior panel to protect the same from an animal's nails and teeth; and at least one hang tab secured to the top edge of the flap, such that a user may easily install and remove the protector from said well.

2. The protector of claim 1, wherein the flap has a predetermined length defined to extend down into the well such that when the window is moved to its lowest position, a bottom edge of the flap extends below a top edge defined by the window.

3. The protector of claim 2, wherein the flap is made of a durable flexible material.

4. The protector of claim 3, wherein the pad is made of a soft flexible material to protect the interior panel from said animal's nails and teeth.

5. The protector of claim 2 further comprising a means of fastening the pad to the interior panel, said fastening means being secured to a lower edge portion of the pad that is adjacent the floor board.

6. The protector of claim 1, wherein the pad includes a removable perforated section defined on a region of the pad that corresponds to said arm rest.

7. A portable pet car door protector for protecting a car door that includes an interior panel, a window, and a well defined between the window and the interior panel, wherein the window may be movable with respect to said interior panel, the interior panel includes an arm rest, the apparatus comprising:

a flap which is insertable in said well between said window and said interior panel of the car door, the flap having a top edge;

a intermediate pad section secured to the top edge and having a length sufficient to extend over said interior panel of said car door to extend over said arm rest, such that the intermediate pad section covers a substantial portion of the interior panel to protect the same from an animal's nails and teeth; and an end pad section having a predetermined length to extend and cover a section of a vehicle seat defined by the vehicle; and a means of attaching said end pad section to said intermediate pad section.

8. The protector of claim 7 further comprising at least one hang tab secured to the top edge, such that a user may easily install and remove the apparatus from said well.

9. The apparatus of claim 7 further comprising a means of fastening the end pad section to the vehicle seat, said fastening means being secured to a lower edge portion of the end pad section.

10. The apparatus of claim 7, wherein the flap is made of a durable flexible material.

11. The apparatus of claim 7, wherein the intermediate pad section is made of a soft flexible material to protect the interior panel from said animal's nails and teeth.

12. The apparatus of claim 7, wherein the end pad section is made of a soft absorbent material.

13. The apparatus of claim 7, wherein the means of attaching said end pad section to said intermediate pad section includes a removable means such that the end pad section is removable from said intermediate pad section.

14. The protector of claim 7, wherein the flap has a predetermined length defined to extend down into the well such that when the window is moved to its lowest position, a bottom edge of the flap extends below a top edge defined by the window.

* * * * *